Jan. 19, 1926. 1,570,405
F. G. SALERNO
MACHINE FOR COATING WAFERS
Filed Jan. 20, 1921 12 Sheets-Sheet 6

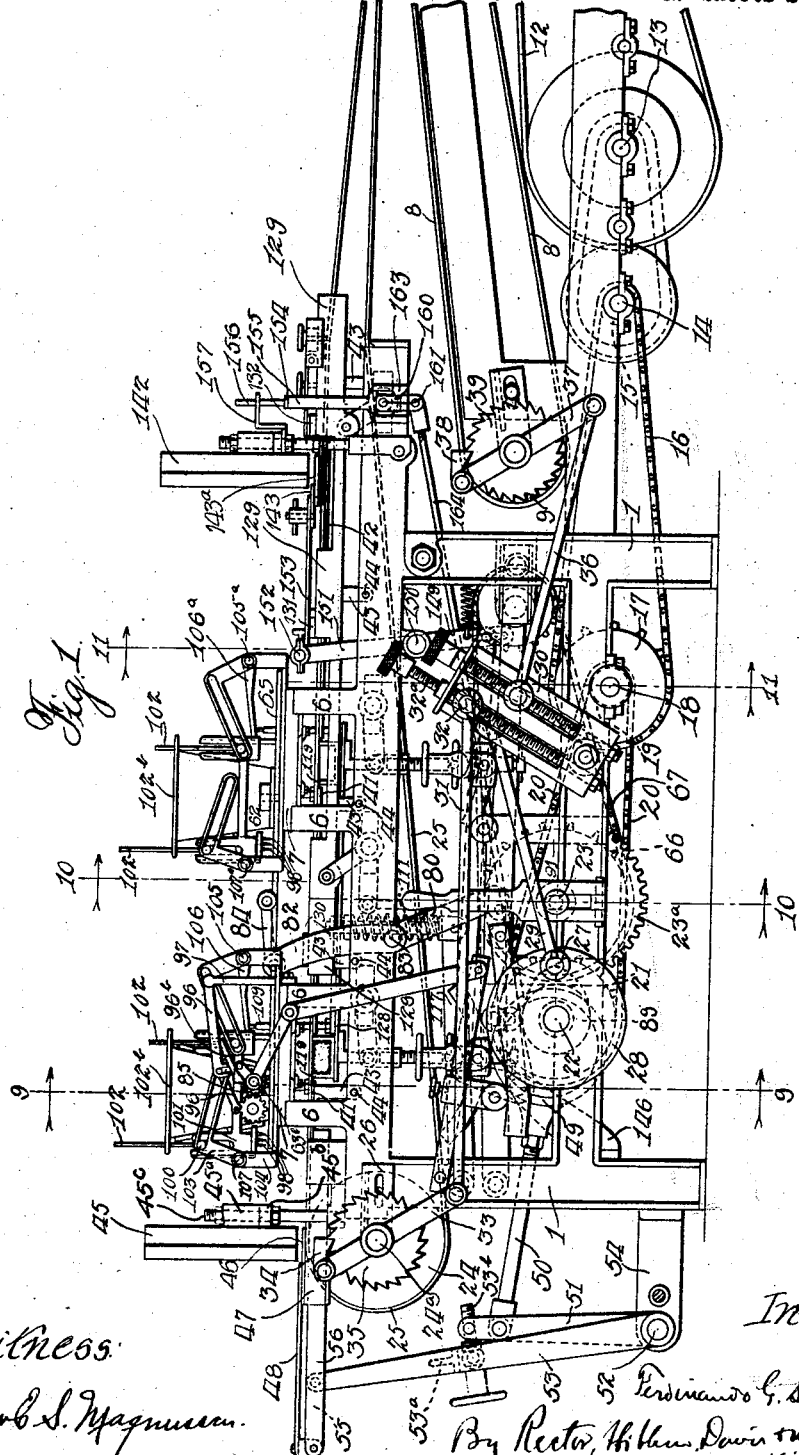

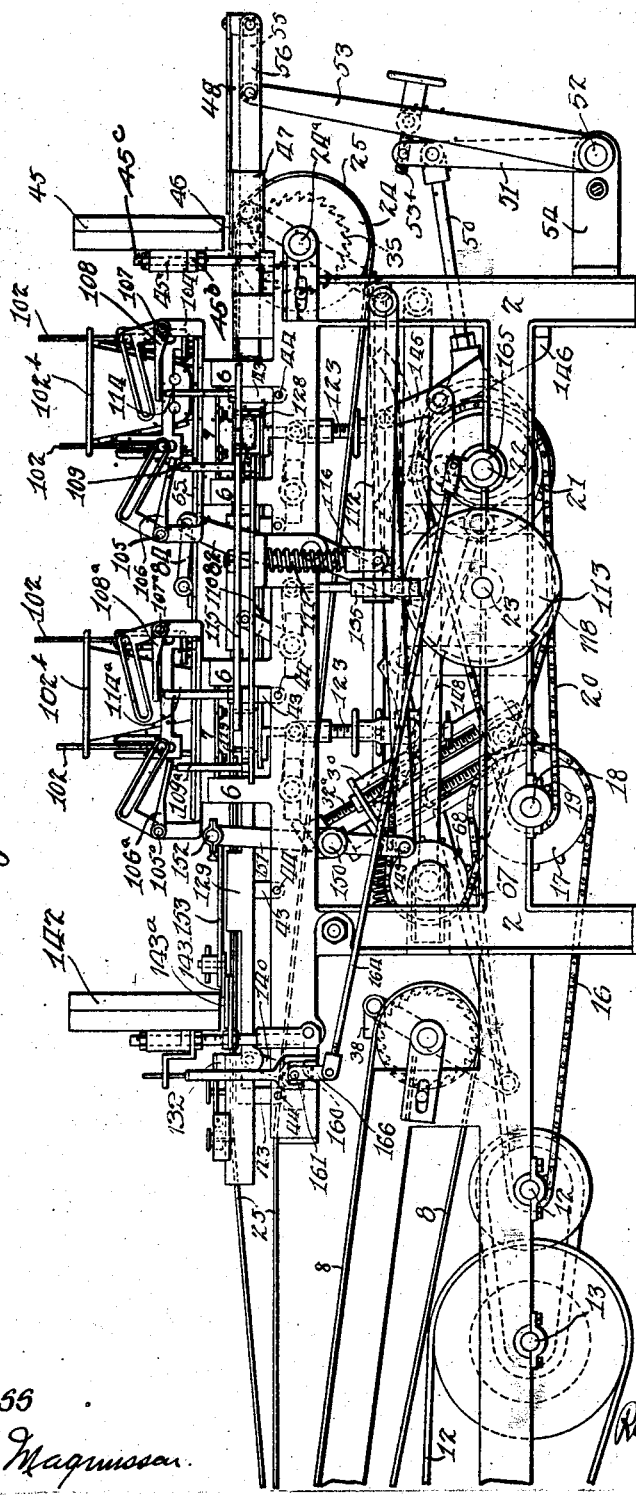

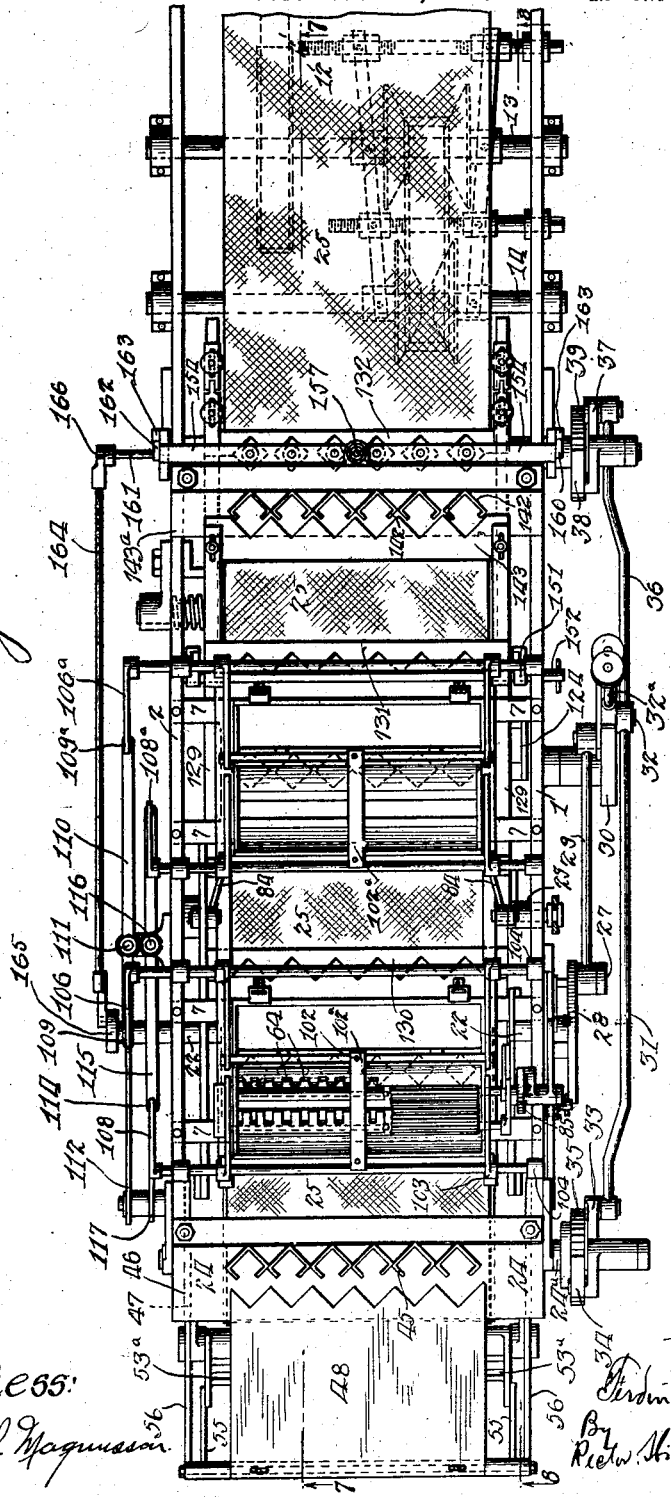

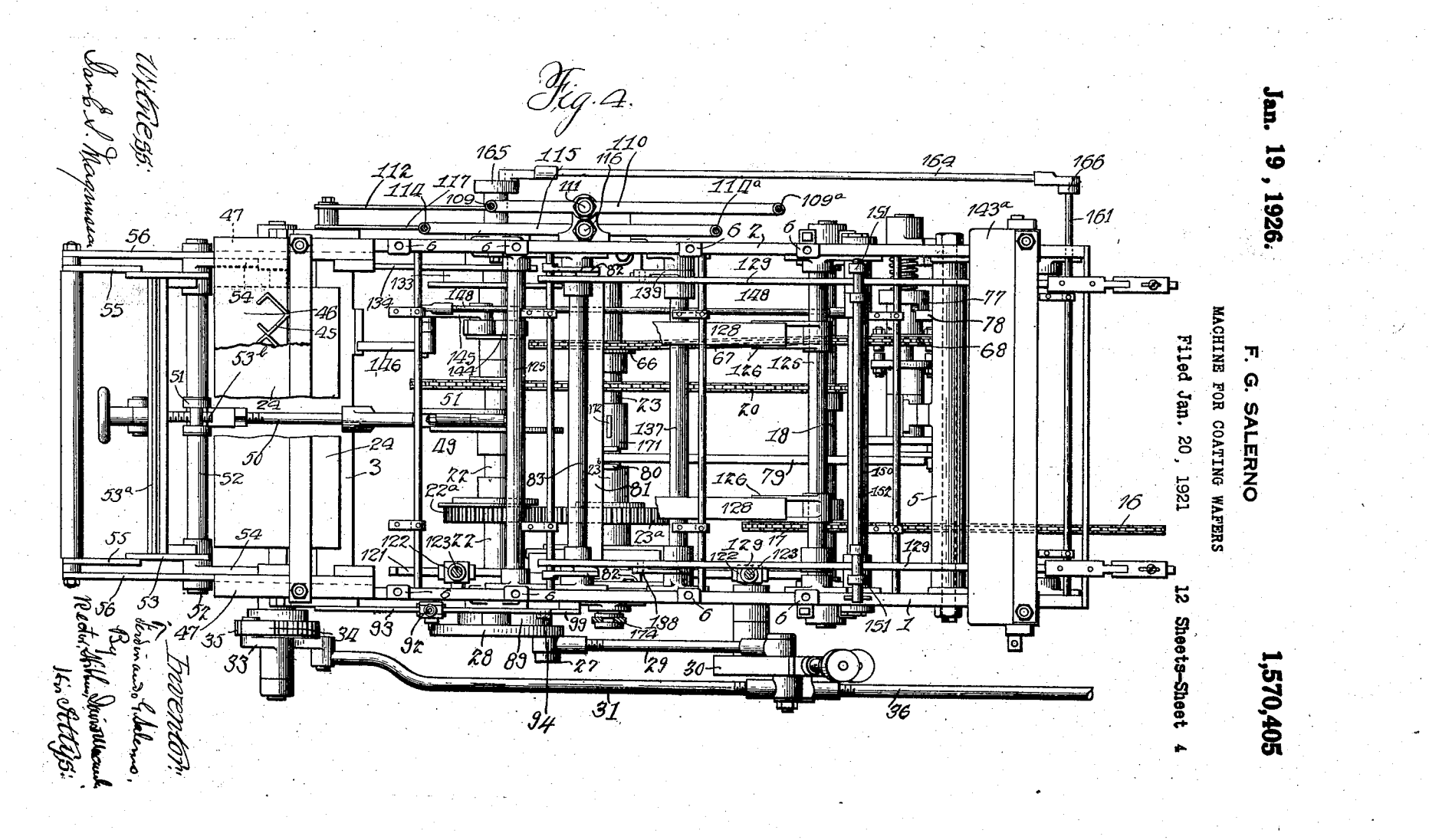

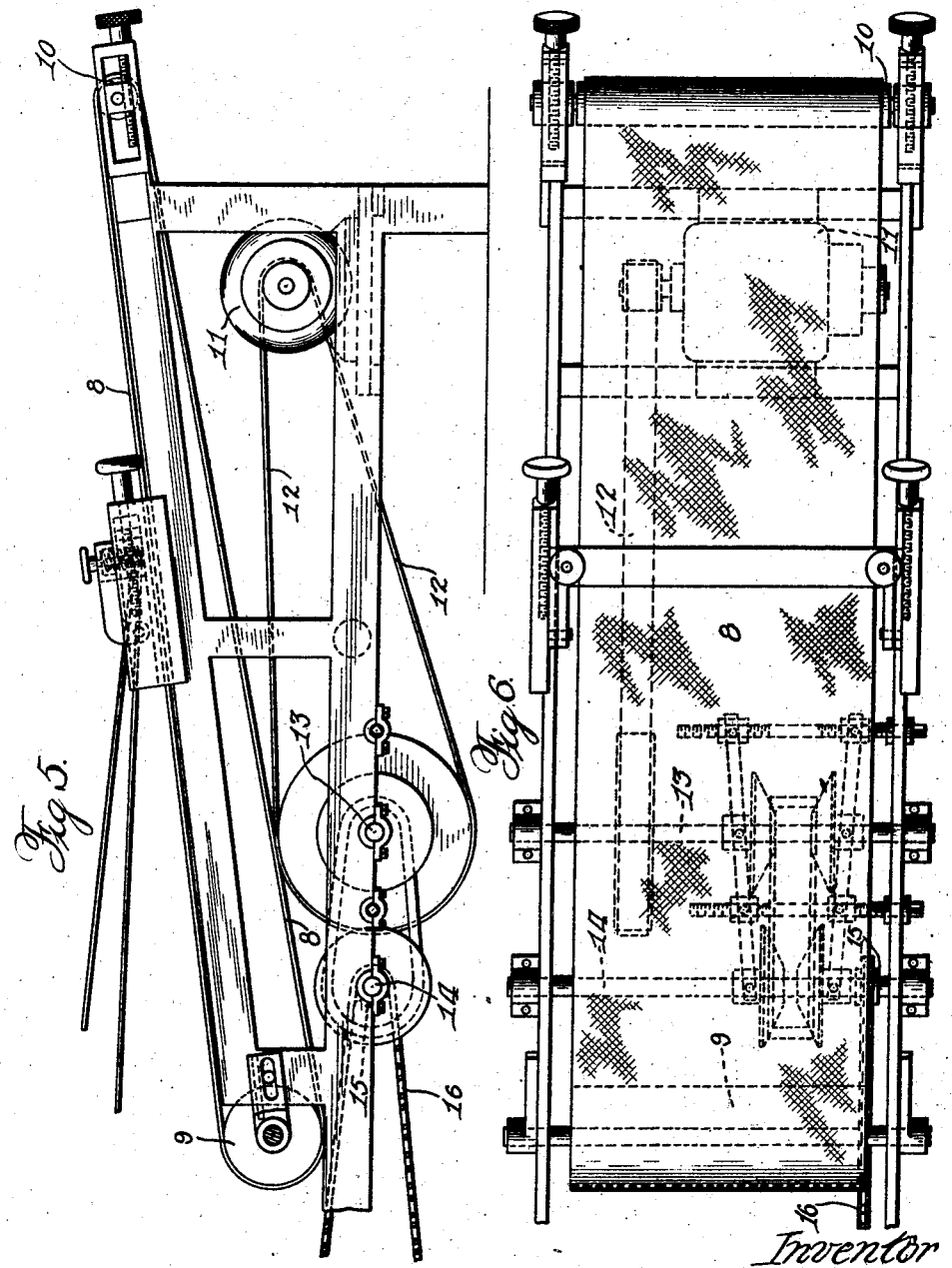

Fig. 1.

Witness
Davl S. Magnusson

Inventor
Ferdinand G. Salerno
By Rector, Hibben, Davis on property
his Attys

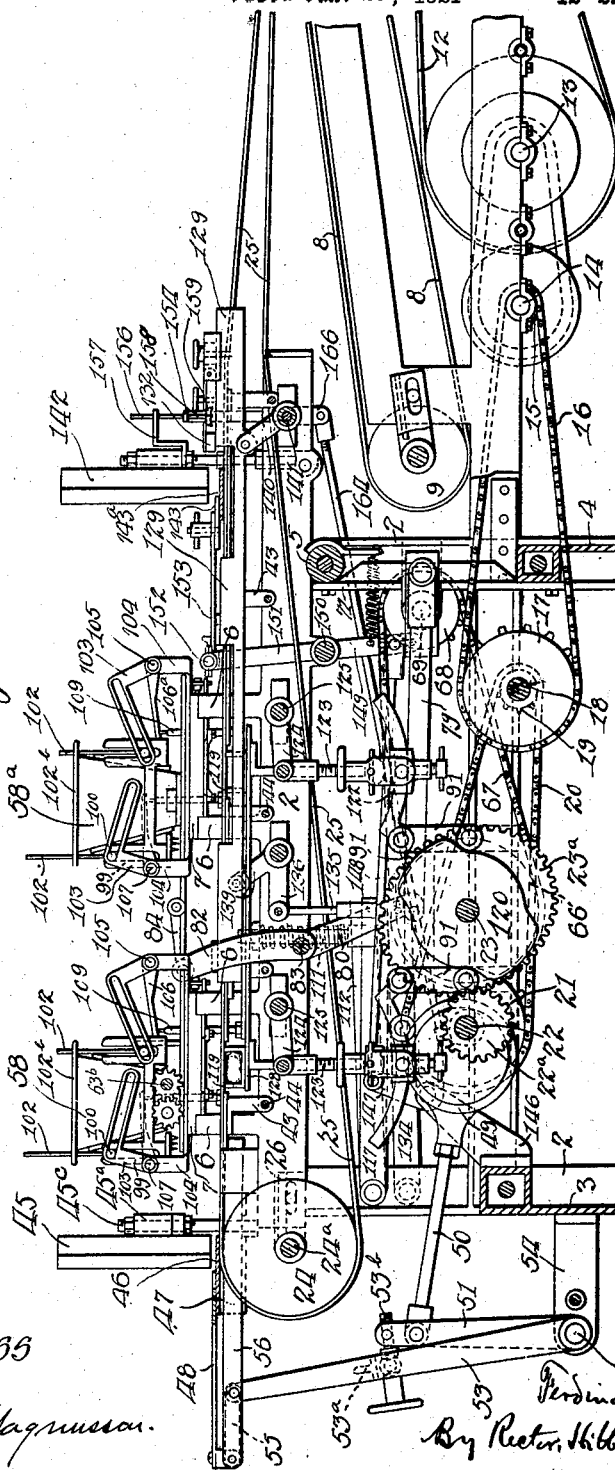

Jan. 19, 1926.

F. G. SALERNO

MACHINE FOR COATING WAFERS

Filed Jan. 20, 1921

Witness
David S. Magnusson

Inventor
Ferdinando G. Salerno
By Rector, Hibben, Davis & Macauley
His Attys

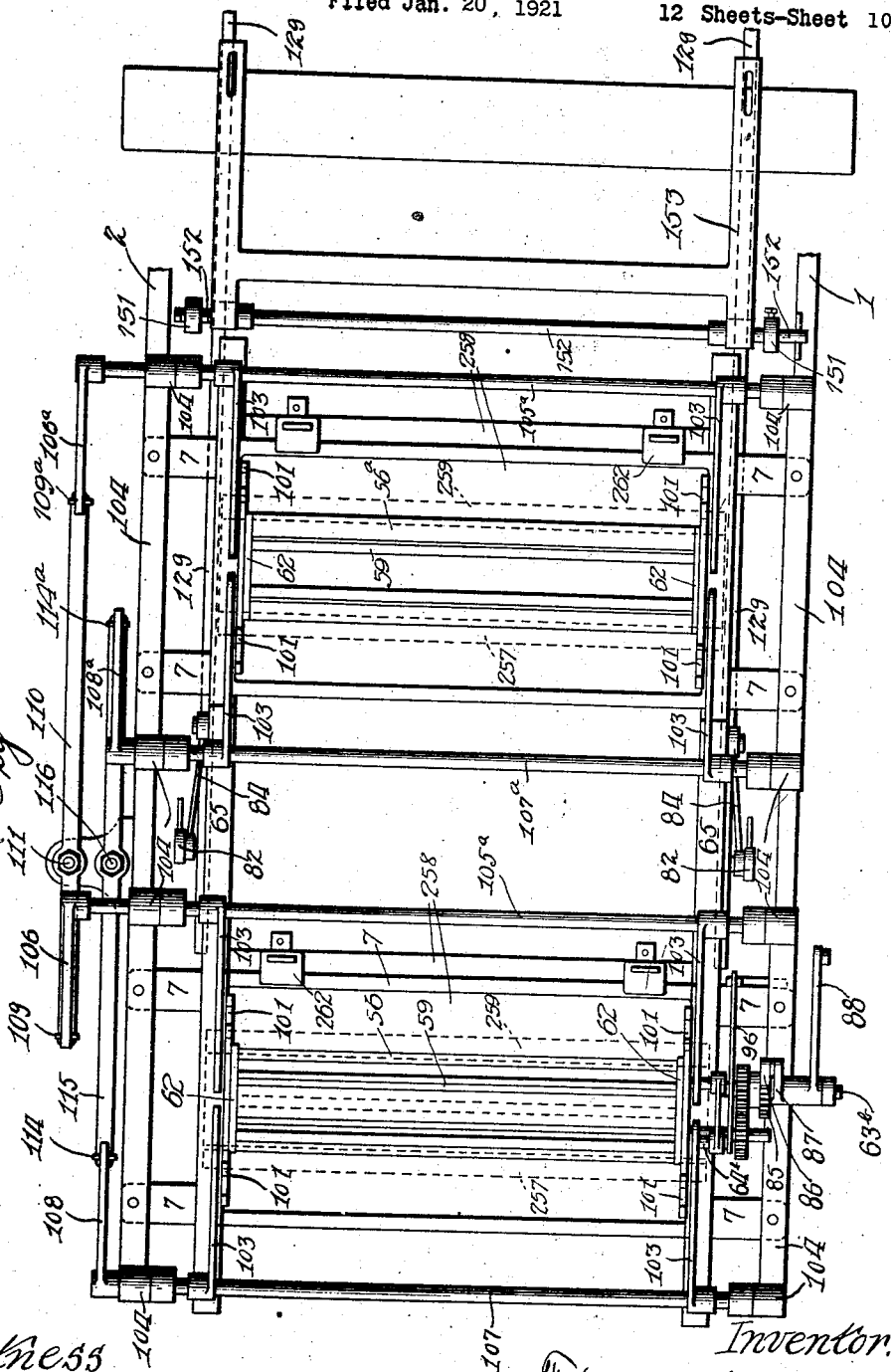

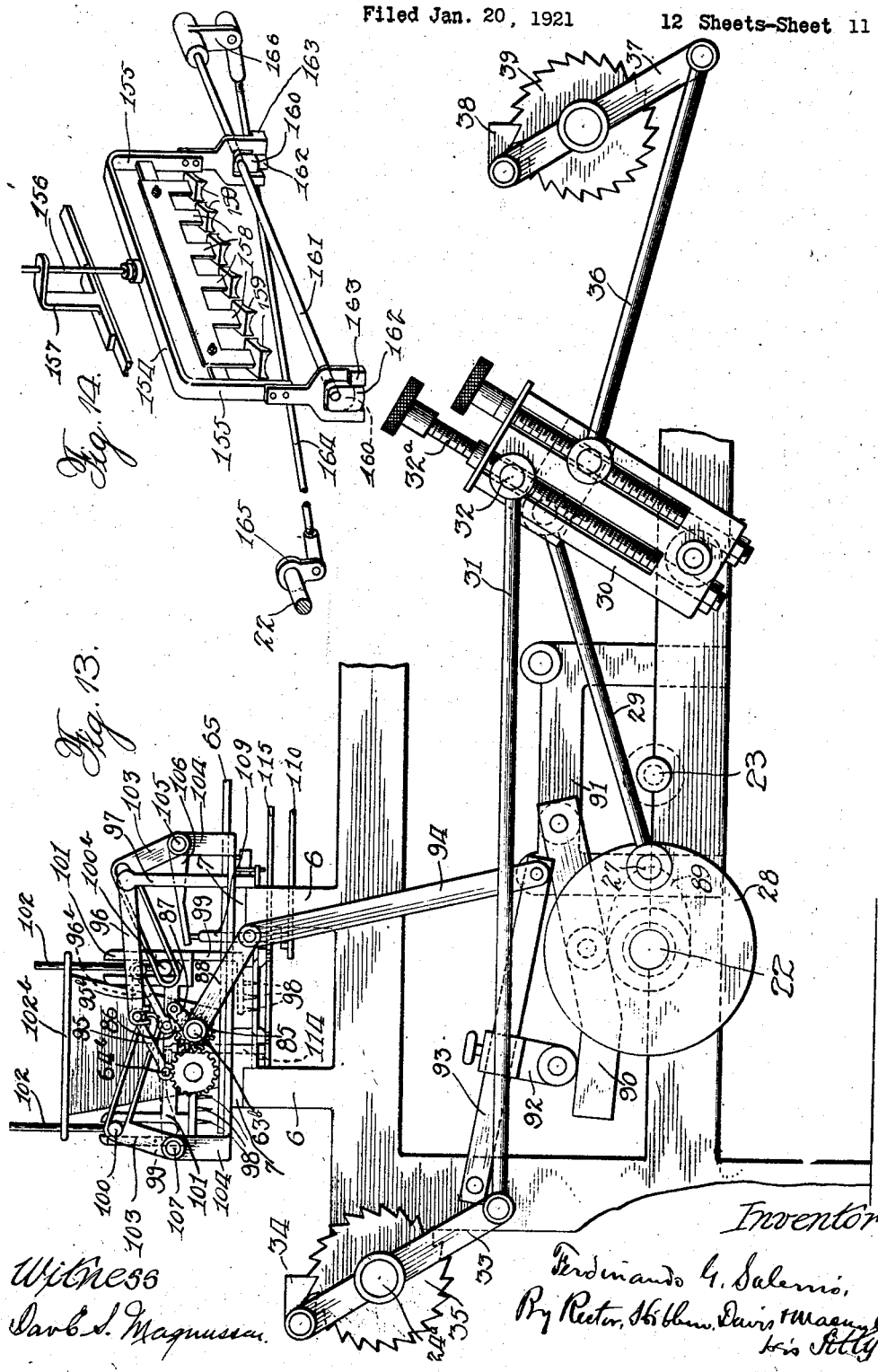

Jan. 19, 1926. 1,570,405
F. G. SALERNO
MACHINE FOR COATING WAFERS
Filed Jan. 20, 1921 12 Sheets-Sheet 12
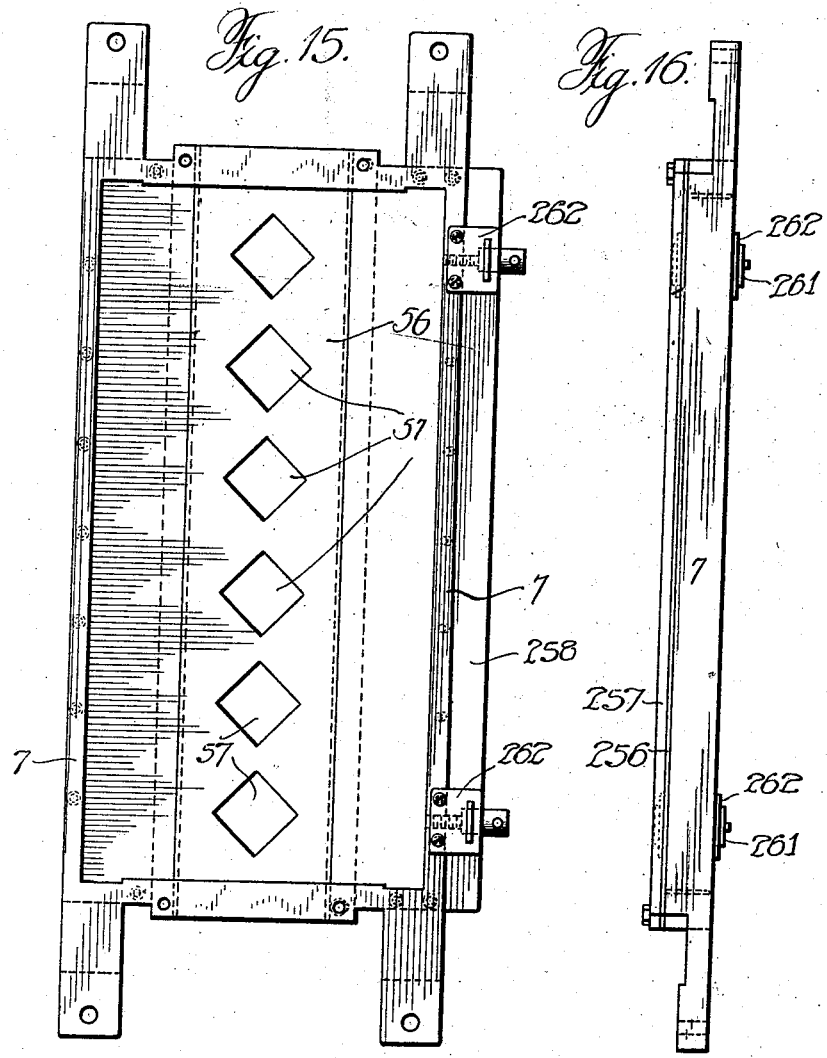
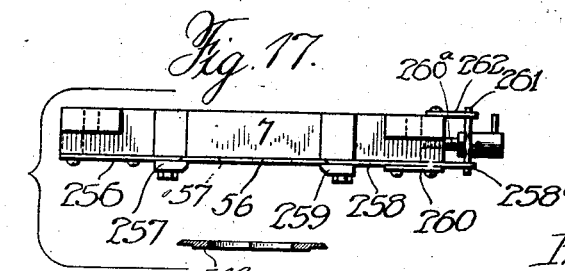

Patented Jan. 19, 1926.

1,570,405

UNITED STATES PATENT OFFICE.

FERDINANDO G. SALERNO, OF CHICAGO, ILLINOIS.

MACHINE FOR COATING WAFERS.

Application filed January 20, 1921. Serial No. 438,561.

*To all whom it may concern:*

Be it known that I, FERDINANDO G. SALERNO, a citizen of the United States, residing at Chicago, in the county of Cook and State of Illinois, have invented certain new and useful Improvements in Machines for Coating Wafers, of which the following is a specification.

My invention relates to a machine designed for the commercial production on a large scale of wafers coated on top with one or more layers of some suitable confection, as chocolate or sugar icing, jams or jellies; or filled wafers, frequently termed in the wholesale bakery trade "sandwich goods", consisting of one or more layers of such confections interposed between top and bottom wafers. My machine belongs to the class in which the confection is applied to the previously baked wafers through the action of a scraping member or blade arranged to force the material through a series of stencil openings in a thin plate onto the faces of cakes presented to such openings. It is the general object of my invention to provide a durable, efficient machine, adapted for continuous, hard, service and capable of producing rapidly and economically a large variety of products of the character mentioned, and to this end I have devised and invented the novel coating and filling machine hereinafter described. My invention resides in the new and useful organization and combination of cooperating parts and elements which make up such machine, in the novel construction and arrangement of the elements of various subcombinations of parts employed therein, and in various features of novelty and utility in the construction and arrangement of particular parts incidental to the main purpose and object of my invention. In the appended claims I have more particularly pointed out the essential elements of my invention, it being understood however, that my invention is capable of being embodied in other and different forms than the particular embodiment hereinafter described, and that such claims are intended to embrace variations and modifications of form and structure which are equivalent to the construction described and which include the spirit and substance of my invention.

Figure 11:
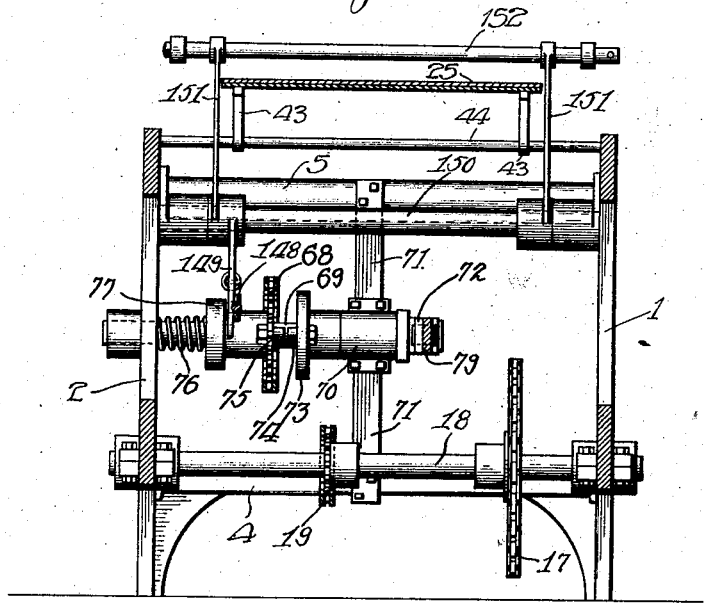
Figure 18:
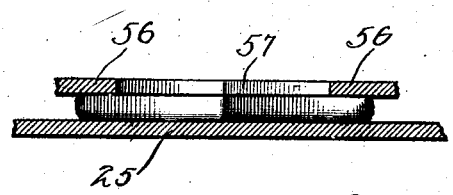
Figure 19:
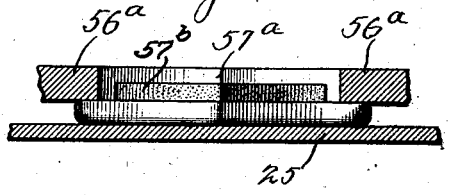
Figure 20:
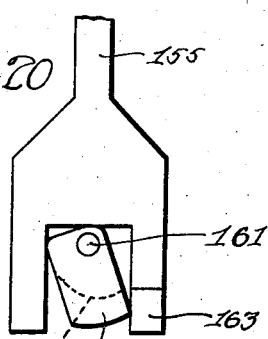

In the accompanying drawings Fig. 1 is a right side elevation of the principal portion of my novel machine for coating and filling wafers; Fig. 2 is a left side elevation of the same; Fig. 3 is a top plan view of the same; Fig. 4 is a plan view of the principal operating connections, mostly lying below the table underneath the belt, parts thereabove being omitted; Fig. 5 is a right side elevation of the forward or delivery end of such machine; Fig. 6 is a top plan view of such portion; Fig. 7 is a longitudinal vertical section of the portion of the machine shown in Figs. 1, 2 and 3, on the line 7—7 of Fig. 3; Fig. 8 is a similar longitudinal vertical section on the line 8—8 of Fig. 3; Figs. 9, 10 and 11 are vertical cross sections on the lines 9—9, 10—10 and 11—11 of Fig. 1; Fig. 12 is a top plan view of the base portions of the two confection hoppers and parts carried by and associated with them, on a larger scale than that of Fig. 3, the upper sheet metal parts of the hoppers and the mechanism arranged therein, belt and parts therebelow being omitted; Fig. 13 is a view of the forward portion of the right hand side of the machine, on a larger scale than Fig. 1, showing also connections for operating the carrier and delivery belts; Fig. 14 is a perspective view of the mechanism for pressing the cover cakes down on the coated cakes; Fig. 15 is a top plan view of a cross frame and plates secured to the bottom thereof forming a portion of the coating mechanism; Figs. 16 and 17 are respectively side and end views of the same; Figs. 18 and 19 are comparative views showing the difference in the size of the stencil openings of the two coating mechanisms; and Fig. 20 is a detail showing the construction of a cam employed in the mechanism for pressing the cover cakes down upon the cover cakes.

The same reference characters indicate the same parts in all the figures of the drawings.

It will conduce to a clear understanding of the construction of my novel machine for making coated and filled wafers to explain briefly its general organization and the manner of its operation before proceeding to a detail description thereof. A substantial metal frame structure of suitable construction is arranged to support an intermittently movable carrier belt or apron actuated by a ratchet-operated drum located at what will be termed the "front" end of the machine and passing around said drum and also, at the rear end of the machine, passing around a narrow stretcher bar. Above the upper reach this belt, at the front end of the machine, is arranged a magazine consisting of a transverse row of vertical cake receptacles, and, associated with the magazine, a feeding mechanism adapted to deposit successively upon the belt, during the closing part of each feeding movement of the belt, a row of cakes to be coated with a plastic confection. By the intermittent movements of the belt the rows of cakes are carried rearwardly through the machine, and during their periods of rest are caused to stop in vertical alignment with the stencil openings of two coating mechanisms, successively, at which periods the belt is lifted and the two rows of cakes in alignment with the two rows of stencil openings are respectively carried into registration with the openings, whereupon the coating is applied by the reciprocation of a pair of connected open-bottom confection hoppers sliding across the respective rows of stencil openings. The forward hopper, which is intended for applying a relatively thick or heavy confection, is provided with feed rollers and reciprocating feed plates for forcing the confection into the stencil openings at the time when the hopper passes over them to apply a coating and both hoppers are equipped with sets of knock-out pins for positively forcing the coated cakes away from the stencil openings as the belt lowers at the end of a coating stroke of the hoppers.

A rising and falling frame equipped with a rectifying or aligning mechanism for each coating mechanism is provided, this frame consisting of connected longitudinal members and notches cross plates or stop bars which are adapted to cooperate with the rear edges of the cakes and act as stops for the rearwardly moving cakes during the closing portion of each intermittent belt movement, and thus cause the cakes to bring up in accurate alignment with the stencil openings.

After passing rearwardly from the second coating mechanism, the coated cakes pass underneath a second cake magazine having a feeding mechanism by which a row of cover cakes is deposited on the coated cakes. This action occurs just at the moment before the apron comes to a dead stop, and the sandwiched cakes bring up against a notched aligning bar which is connected to the rising and falling frame and is of such thickness as to align both the top and bottom cakes together. A row of pressure members then descends upon the top cakes to press them gently down upon the lower cakes a limited distance, and the cakes are then carried rearwardly by the intermittent belt movements and discharged upon trays carried by a second belt for removal and packing.

Describing now more in detail the parts of the machine, the machine frame includes a pair of opposite right and left side frame members marked respectively 1 and 2, each formed with end posts and an upper and lower side bar; forward and rear cross-plates 3 and 4; a tubular cross-member 5 adjacent the top of the rear leg portions of the side frame members; and various cross rods and other cross members serving to unite and secure the side frame members together and afford a support for the movable parts of the machine. Among these members are two rectangular cross-frames 7, which form part of the coating mechanism hereinafter described and which are bolted to pairs of posts 6 formed on the upper side bars of the frame.

Extending rearwardly of the frame structure just described, and bolted to it, is a rear frame consisting also of opposite side frame members secured together by cross members, this frame being arranged to support a delivery belt 8 which is intermittently driven by a drum 9 and which passes at the rear end of the machine around an adjustably mounted idler roller 10. In the present instance my machine is arranged to be driven by an electric motor, to which end the shaft of the motor 11, which is supported on cross frame members, is connected by a belt 12 with a pulley mounted on the driving shaft 13 of a variable speed transmission mechanism which need not be particularly described as it forms no part of my present invention. This mechanism transmits power to a shaft 14, the latter shaft being in turn connected by means of a small sprocket wheel 15 secured thereto and a chain 16 with a larger sprocket 17 which is secured to a shaft 18 journaled in the opposite lower side members of the machine frame. To this shaft 18 is keyed a small sprocket wheel 19 which by a chain 20 is connected with a large sprocket wheel 21 on a cam shaft 22, this latter shaft being the main shaft of the machine through which movements are imparted to the principal parts of the machine. The shaft 22 is connected by gearing with a shaft 23 in such manner that while the former shaft is rotating twice the latter shaft will be rotated a single time, and in order to produce a regularly recurrent variation in speed of the latter shaft I have in the present instance employed an eccentrically mounted elliptical pinion 22$^a$ secured to the shaft 22, intermeshing with an oval pinion 23$^a$ disconnectibly secured to the shaft 23, the last mentioned pinion being centrally mounted and having twice the number of teeth of the pinion 22$^a$, thus producing during each revolution alternate phases of acceleration and retardation in speed of the shaft 23.

The drum 24 by means of which the conveyor belt, marked 25, is intermittently driven, is secured to a shaft 24ª journaled in a pair of opposite brackets 26 secured to the machine frame, and is actuated through connections comprising a crank pin 27 carried by a disk 28 secured to the cam shaft 22; a connecting rod 29 pivoted to said pin and to an oscillating frame 30; a second connecting rod 31 which is pivoted to a pivot 32 having a base engaging an adjusting screw 32ª mounted in said oscillating frame 30; and an oscillating lever 33 loosely pivoted on the shaft 24ª and equipped with a pawl 34 arranged to cooperate with a ratchet wheel 35 secured to said shaft.

The delivery belt is actuated in a similar manner, through a connecting rod 36 connected to the oscillating frame 30 above mentioned and also connected to an oscillating lever 37 which is equipped with a pawl 38 adapted to turn a ratchet wheel 39 secured to the shaft of the drum 9.

The upper reach of the conveyor belt 25 runs over the surface of a series of sheet metal table members consisting of the plates 40, 41 and 42, supported by L-shaped brackets 43 mounted on crossrods 44 extending across the machine between the upper side frame bars.

The cake magazine at the front end of the machine comprises a series of connected vertical holders 45 adapted to receive the cakes stacked in vertical stacks, the front sides of the holders being cut away vertically to facilitate the work of keeping the holders supplied with cakes by attendants of the machine. The magazine is removable as a unit, in order that it may be interchangeable and the machine may be adapted to operate upon cakes or wafers of different sizes and shapes, and is supported by means of orificed sleeves 45ª secured to the opposite ends of a cross-bar 45ᵇ supporting the magazine sections, such sleeves being arranged to slidingly engage stationary screw-threaded posts 45ᶜ, which latter are provided above and below the sleeves with nuts by means of which the magazine may be adjustably secured at any desired elevation above a table 46. This table is supported by opposite brackets 47 secured to the side members of the frame of the machine, the table being arranged immediately over the front end of the top reach of the carrier belt. The space between the table and bottom of the holders is sufficient to permit a single row of cakes to be pushed rearwardly from the bottom of the stacks by a removable reciprocating slide 48 of slightly less thickness than a single cake, and deposited upon the surface of the belt, the slide then being retracted to the front side of the magazine to permit the stacks of cakes to drop from the slide to the table. The front or working edge of the slide is notched to center and align the cakes as they are transferred from the magazine to the surface of the carrier belt.

The means for reciprocating the slide in the necessary timed relationship comprises an eccentric 49 secured to the cam shaft 22, and a pitman rod 50 pivotally connected at its forward end to the forked upper end of an oscillating bar 51 rotatably mounted on a cross-shaft 52, to which latter is pinned an oscillating frame 53, the shaft 52 being journaled in opposite brackets 54 secured to the machine frame. This frame 53 has a cross-member 53ª, formed with lugs which afford a pivotal support for an adjusting screw 53ᵇ equipped with a hand wheel and having a swiveled connection with the pivot of said support and having also a screw-threaded connection with a cross-pivot passing through the forks of the bar 51 adjacent the pivotal connection of the pitman 50 before mentioned. The upper ends of the side members of the frame 53 are connected by links 55—55 with the rear corners of a frame 56 slidingly mounted in the brackets 47 above mentioned, to which frame is secured the slide 48. By adjustment of the screw 53ᵇ the throw of the slide 48 can be varied even while the machine is in operation.

The mechanism by means of which the confection is applied to the cakes may next be described. Each of the two cross-frames 7 mounted on the posts 6 before mentioned consists of an oblong central portion forming the ends and sides of what may be termed a stencil box, and lugs projecting laterally from the four corners of such box and arranged to seat upon and be secured to the posts. The bottom of each stencil box is in the present instance, though not necessarily, of sectional construction, and consists of three plates having their upper surface arranged in the same plane, the center plate, or stencil plate proper, being formed with a row of stencil openings.

The stencil openings in both stencil plates correspond in shape to the shape of the wafers being operated upon, and the openings 57 of the plate 56 of the first or forward box are of somewhat smaller size than the openings 57ª of the plate 56ª of the rear box, the size of the opening being such as to each afford a bearing around the margin of each particular cake. The plate 56 of the forward box is also not so thick as the plate 56ª of the rear box, the result of these differences being that the deposit of confection placed upon each cake by the action of the first coating mechanism will entirely clear the edges of the particular stencil opening of the plate 56ª of the second coating mechanism to which it is presented when the belt is lifted for the application of a second coating, and the top of such first deposit (marked 57^b in Fig. 19) will lie below the plane of the top of the plate 56^a, to provide space for the second coating to be applied.

To provide for interchanging the center plates, or stencil plates proper, in order to adapt the machine for operating on cakes of different sizes and shapes, each stencil plate is beveled on its longitudinal edges and locked between correspondingly beveled plates on its opposite sides, one of the side plates being arranged to be tightened up against the stencil plate to secure it firmly in working position. One side plate, marked 256, is stiffened along its inner longitudinal margin with a bar 257 secured thereto, which bar slightly underhangs the bottom of the center plate, or stencil plate proper, and the plate and bar are rigidly secured to the frame plate 7. The opposite side plate 258 is similarly stiffened with a corresponding marginal bar 259, but is adjustably arranged between the frame plate and a backing plate 260 arranged longitudinally of the frame below such plate 258. The plate 258 is adjustably secured to the frame plate by means of headed screws passing through slots or oversize holes in the plates 258 and 260 and by a pair of fastening and tightening devices. These devices each consist of an adjusting screw 260^a bearing in the side member of the frame 7 and having swiveled connection with a vertical flat cross-pin 261 engaging at its bottom an integral slotted tongue 258^b projecting from the plate 258 and at its top a similarly slotted tongue 262 secured to upper side of the plate 7 and serving as a fulcrum upon which the cross-pin 261 may rock slightly in tightening up and releasing the stencil plate.

The front confection hopper 58 and rear hopper 58^a are very similar, though not identical, in construction, and on the drawing corresponding parts of the two hoppers and parts associated with them will be indicated by the same numerals, except as otherwise particularly designated. Describing the construction of the front hopper, such hopper consists of a cast open bottom base portion 59 adapted to slide rearwardly and forwardly in the stencil box, to which base is secured an inner sheet metal upper portion 60 and an outer sheet metal portion 360 connected at the top to form a closed water jacket adapted to be filled with hot water to increase the fluidity of the contents of the hopper, a suitable filling orifice and drain cock being provided to enable the water to be supplied and emptied. At the bottom the base portion has narrow opposite inclined side walls 61 spreading away from each other from top to bottom, and, connecting said side walls, also has vertical end walls 62, rising above the plane of the top of the side walls, the end walls being formed with bearings for the journals of the feed rollers 63 and of a pair of oscillating feed plates 64. Since the front hopper is intended for the application of relatively stiff material the walls 61 are further inclined from the perpendicular than the walls marked 61^a, of the rear hopper, and for the same reason the feed rollers 63 and feed plates 64 are essential only in the front hopper. The two hoppers are secured together by a pair of side bars 65, and are slidingly reciprocated in the two stencil boxes in unison by a train of operating connections which will now be described.

Secured to the shaft 23 is a sprocket wheel 66, connected by a sprocket chain 67 with a sprocket wheel 68, the hub of which is rotatably and also slidably mounted upon a shaft 69, this sprocket wheel 68 having half the number of teeth of the wheel 66. This wheel, therefore, during each revolution has one phase of acceleration and one of retardation. The shaft 69 extends but part way across the machine and its inner end is journaled in a bearing 70 carried by a vertical frame member 71 secured at top and bottom respectively to the frame members 5 and 4 before mentioned. The inner end of the shaft extends beyond the bearing 70 and is provided with a crank 72. On the opposite, or inner side of said bearing a disk 73 is secured to the shaft 69, this disk being equipped with a pair of laterally projecting lugs 74 adapted to cooperate with a pair of similar lugs 75 projecting from the adjacent side of the sprocket wheel 68. The sprocket wheel is pressed towards the disk 73 by means of a coiled spring 76 which serves to normally maintain the lugs 75 in position to engage the lugs 74. The hub of the sprocket wheel 68 is formed with a cam 77 adapted to cooperate with a stationary cam lug 78 carried by a bracket secured to the frame of the machine, the arrangement and adjustment of the parts being such that as the wheel 68 is rotated continuously— though at a variable speed—the lugs 75 and 74 will be in engagement during one-half a revolution and will turn the crank 72 from one horizontal position to a diametrically opposite position, the cooperation of the cam members 77 and 78 serving to shift the lugs 75 out of engagement with the lugs 74 as the opposite position is reached and maintain such disengagement until the lugs 75 have rotated through an arc sufficient to cause them to clear the lugs 74, when the cam 77 clears the cam lug 78 and the sprocket wheel is shifted to normal position by the spring 76, after which the sprocket wheel 68 continues to rotate through the remainder of the second half revolution while the disc 73 and connected parts remain stationary until the lugs 75 come into contact with the lugs 74 at the end of such second half revolution, whereupon the movements of the parts will be repeated. At each complete revolution of the sprocket wheel 68, therefore, the crank 72 will be turned one-half revolution with the sprocket and will remain motionless in opposite positions alternately. The adjustment of the gearing is such that the turning of the crank is accomplished during the phase of greatest speed, which endures about three-eighths of the time of an entire cycle.

The movement of the crank 72 is arranged to reciprocate the hoppers through a connecting rod 79 pivoted at one end to the crank and at its opposite end to the depending split arm 80 of a rocking frame, which latter consists of a cross member 81 and a pair of curved ascending side members 82 intermediately secured to a cross shaft 83 journaled in bearings carried by the machine frame at its opposite sides. The upper ends of the portions 82 of the frame are respectively connected by a pair of pivoted links 84 with the two side bars 65 which connect the two hoppers.

The feed rollers 63 of the front coating mechanism are preferably formed with longitudinal grooves on their faces to facilitate the feeding of material between them, and their shafts are provided with intermeshing pinions of different sizes to cause their adjacent surfaces to rotate downwardly together, but at different rates of speed, this arrangement in practice being found more effective than if the rollers were rotated at the same speed. To the shaft marked 63$^b$, of one roller, is secured a ratchet wheel 85 adapted to cooperate with a pawl 86 pivoted to the upper end of the short arm 87 of a two armed lever which is rotatably mounted on said shaft, the longer arm 88 being arranged to be oscillated to cause at proper intervals an intermittent feeding movement of the rollers. This movement is effected in the following manner:

To the cam shaft 22, adjacent the crank disk 28, is secured an oval cam 89 adapted to cooperate with a cam roller carried on an intermediate portion of a rocking lever 90 pivoted at its rear end to a frame bracket 91, this bracket having vertical side members bolted to the lower side bar of the frame and a connecting cross bar at the top of the side members. The front portion of the lever 90 is adapted to cooperate with a roller carried by a block 92 which is slidably mounted on an oscillating arm 93 pivoted at its front end to the side of the machine frame. The rear end of such arm is pivoted to the lower end of a connecting rod or link 94 which is pivotally connected at its upper end to the end of the arm 88 of the oscillating two armed lever before mentioned. The relatively limited movement of the cam 89 is thus multiplied to produce an extended sweep of the arm 88, and by adjustment of the block 92 the extent of turning movement of the feed rollers can be regulated.

The feed plates 64 of the front coating mechanism are formed of thin sheet metal and are secured to flat-sided shafts 64$^b$ which are journaled in the end plates of the hopper above the feed rollers, the shafts being rotated to oscillate the plates simultaneously first in one direction and then in the other, the plates during their positions of rest occupying alternately the position shown in Fig. 7, and a corresponding opposite position in which the relations of the two plates are reversed. The free sides or edges of the plates 64 are formed with intermeshing square notches sufficiently deep to avoid interference as the one plate swings upward and the other downward in their alternating movements. As the hopper passes from one extreme position to the other in coating the cakes, the blade movement which has just been described is effected automatically by means of arms 95, 95$^b$ secured respectively to the two shafts 64$^b$; a link 96 pivoted at one end to a post 97 secured to the stationary stencil frame members 7 before mentioned and also connected by a slot and pin pivotal engagement with the arm 95; and a link 96$^b$ connecting the upper ends of the two arms 95 and 95$^b$; so that the reaction of the link 96 against the stationary post 97 will cause the two arms to swing in substantial parallelism, and thus oscillate the plates as described.

The mechanisms for stripping the coated wafers from the stencil openings of the two coating mechanisms are duplicates of each other with respect to the parts associated with the two hoppers, and corresponding parts are indicated on the drawings by the same reference character. In each coating mechanism the two sets of stripper pins 98 by which the coated cakes are dislodged from the stencil openings are carried by a pair of stripper bars 99 formed with upturned vertical strips which are respectively riveted to a pair of square bars 100—100$^b$ extending lengthwise of the particular hopper on its opposite sides and respectively arranged to engage opposite vertical guideways formed by the front and rear forked members respectively of a pair of guide frames 101—101 secured to the opposite ends of the hopper casting. These bars are each equipped with a central vertical guide pin 102 which is arranged to engage an orifice in the adjacent end of a bar 102$^b$ extending transversely across the top of the hopper, that is, extending longitudinally of the machine. The ends of the bars 100 and 100$^b$ are rounded, and the four rounded ends respectively arranged to engage the upwardly inclined slotted cam arms of two pairs of oppositely arranged L-shaped levers 103 which are formed with downwardly inclined arms secured at their lower ends to a pair of rock shafts journaled at their ends in the adjacent ends of a pair of U-shaped frame members 104 arranged longitudinally of the machine and bolted to the frame posts 6 above the interposed supporting lugs of the stencil frame member 7. The rear rock shafts of the front and rear coating mechanisms, marked 105 and 105$^a$ respectively, are provided, at the left hand side of the machine with rock arms 106—106$^a$ lying in one and the same vertical longitudinal plane; and the front rock shafts, marked 107—107$^a$, respectively, are provided with similar rock arms 108—108$^a$ lying in an adjacent parallel plane. The rock arms 106—106$^a$ are respectively supported by posts 109, 109$^a$ which are rigidly secured to a horizontal bar 110 which intermediate such posts is rigidly secured to a downwardly spring-pressed vertical rod 111, this rod having a forked lower end pivotally secured to a link 112 which at its forward end is pivoted to the machine frame and at its rear end is equipped with a cam roller arranged to engage a cam 113 fixed to the shaft 23. The shape of the cam 113 is such as to initially lower the roller slightly and then drop the roller sharply off a shallow shoulder on the face of the cam once during each revolution, and immediately raise it again. The rock arms 108—108$^a$ are similarly supported and connected by posts 114—114$^a$, horizontal bar 115, vertical rod 116, link 117 and cam 118, this cam being arranged with its cam shoulder diametrically opposite that of the cam, 113. The arrangement and adjustment of the parts and operating connections associated with the stripper pins is such that during a traverse of the hopper in a given direction the stripper bar and pins ahead of each hopper will be lifted by the action of the slotted arms of the L-shaped levers 103, while the stripper bar and pins following each hopper will be lowered until they reach a point in alignment with the stencil openings, and as the belt is lowered (by means later to be described) the cam will operate to cause a brief but gradual initial lowering movement to the bar and connected pins of the two coating mechanisms to disengage the coated cakes from the stencil openings and then give a short, sharp stroke to such bars and pins to disengage the pins from the coatings upon the cakes. Upon the shifting of the hoppers in the opposite direction the lowered stripper bars will rise and the other stripper bars and pins be lowered and actuated through the other cam and connections, and so on.

Between its intermittent longitudinal feeding movements, the belt is lifted to carry the rows of cakes carried thereby into registration with the stencil openings by means of two open top cushioned lifting boxes 119 extending transversely across the machine in alignment with the forward and rear stencil plates and arranged to be lifted in the spaces respectively lying between the table members 40 and 41, and 41 and 42. The boxes are each equipped with a pad of cushioning material, such as a rubber apron over the top of the box, or an inflated rubber bag, (see Fig. 1) or a pad of soft fibrous material arranged therein, (as in Fig. 7) to avoid crushing the cakes, or, if the carrier belt is somewhat elastic and the box sides are sufficiently wide apart to provide a yielding span, the cushioning material may be omitted, see Figs. 1, 2, 7 and 8.

The lifting boxes are carried by and secured to a pair of bars 128 arranged longitudinally of the machine underneath the opposite edge of the belt, and the opposite ends of these bars are simultaneously lifted by connections similar to each other. These connections for lifting the bars and boxes are both operated by a cam 120 arranged to cooperate with cam rollers carried by the depending arms of a pair of two-armed levers 121—121 pivoted to the opposite sides of the frame bracket 91 before mentioned adjacent the top thereof. The horizontally-extending arms of these levers are curved and arranged to support respectively blocks 122—122 slidingly adjustable thereon, these blocks being connected by connecting rods 123—123 with crank-arms 124—124 connected to rock shafts 125—125 journaled in bearings carried by the opposite side members of the machine frame. Secured to each rock shaft is a pair of rock arms 126, 126 respectively arranged underneath the opposite sides of the conveyor belt, the front and rear arms 126 on each side being pivotally connected to depending posts 127—127 secured to the opposite ends of the bars 128 above mentioned. The connecting rods 123 have a telescoping hand-operated turn buckle connection by means of which the vertical position of the two boxes can be independently regulated to take up any lost motion between the particular box and the belt, and the throw of the curved arm of the levers 121 can be regulated by adjustment thereon of the blocks 122 to vary the lifting pressure against the cakes as may be necessary.

The rectifying or aligning mechanism for truing up the cakes under the stencil openings consists of an oscillating frame comprising a pair of side bars 129 to which are rigidly secured three notched cross plates forming stops, the forward bars and middle bars, marked 130, and 131 respectively, being so arranged that the cakes will bring up against them and be centered in the notches while they are in lowered position after the belt has traveled about two-thirds of its stroke, and the rear bar 132 being set relatively further to the rear so that the pairs of sandwiched cakes will not bring up against it until just before the end of the belt movement. The rear bar which is thicker than the other two is in the present instance hinged so that it may conveniently be thrown back to give free access to the base of the rear magazine and the pressure mechanism. The oscillating frame is given an oscillating movement between a rearward elevated position and a forward lowered position by means of a cam 133 fixed to the cam shaft 22 near the left hand side of the machine. This cam is arranged to cooperate with a cam roller secured to the intermdeiate portion of an oscillating lever 134 which is pivoted at its front end to the machine frame and at its rear end is pivotally connected to the lower end of a vertical connecting link 135 pivoted at its upper end to the horizontal crank member 136 of a V-shaped lever secured to a cross-shaft 137 journaled in the upper side bars of the machine frame. To the opposite end of the shaft 137 is secured a rock arm 138 parallel with the other arm (marked 139) of the V-shaped lever, and the two side bars 129 of the oscillating frame are respectively pivotally connected with the ends of the arms 138 and 139. The rear ends of the two side bars are similarly supported by rock arms 140—140 fixed to a rock shaft 141 which is journaled in bracket extensions of the side members of the machine frame.

The rear cake magazine 142, located rearwardly of the rear coating mechanism, is similar in construction to the forward magazine above described, but its feed slide 143 is independently operated and differently timed through connections controlled by an egg-shaped cam 144 secured to the cam shaft 22. This cam is arranged to cooperate with a cam roller carried at the end of the lower horizontal arm 145 of a bell-crank lever which is pivoted to a bracket 146 secured to the front cross-plate 3 of the machine frame, a vertical arm 147 of said bell-crank being pivotally connected by a rod 148 with the lower end of a depending spring-stressed lever 149 which is secured to a rock shaft 150 journaled in brackets secured to the upper side frame bars of the machine, the pivotal connection of the rod 148 with the lever 149 being adjustable to vary the throw of such lever. Secured to this rock shaft is a pair of rock arms 151—151 arranged respectively near the opposite ends of the shaft, the upper ends of the arms being connected by an adjustable cross rod 152 on which are pivoted bearing lugs extending forwardly from a U-shaped frame 153 to which the notched feed slide 143 is secured. This feed slide is secured to the frame by thumb screws passing through slots formed in the ends of the slide, to provide for adjustment of such slide longitudinally of the machine, and plays over the surface of a stationary table 143ª, below the magazine, to provide for lateral adjustment of the slide so that its notches will register accurately with the notches of the rear stop bar 132, the cross rod 152 is equipped with collars 152ª preventing sidewise movement of the frame 153, and such rod has a threaded engagement with the left hand rock arm 151, and is arranged to be secured to the other rock arm by a set screw.

In order to press the cover cakes into proper contact with the coated cakes and produce sandwiched wafers of uniform thickness I have provided a series of pressure members which are arranged to descend upon the cakes at the end of each feeding movement of the belt and at the time they are confined between the slide 143 and rear stop bar 132, and are also arranged to have at the limit of their downward movement a slight rearward movement, to carry the cakes rearwardly and thus seat and center them accurately in vertical alignment with each other in the notches of the rear stop bar. To this end I employ a vertically movable U-shaped frame 154 having depending forked side bars 155, and an upwardly extending guide rod 156 which engages a stationary bracket 157 on the machine frame, this frame 154 having a series of vertically disposed pins 158 equipped with contact members 159 adapted to engage the cakes. Preferably these members are cushioned, and in the present instance they consist of inverted rubber cups. The frame 154 is raised and lowered by means of a pair of cam blocks 160 carried by an oscillating rock shaft 161 journalled in the side members of the machine frame, and engaging the U-shaped lower forked ends, and such frame is given a rearward movement at the limit of its downward movement by means of a pair of contact blocks 162 which lie just outside the planes of the cams 160 and are arranged to cooperate with lugs 163 extending outwardly from the forward members of the forked lower ends of the side bars of the frame. The rock shaft 161 is given an oscillating movement by means of a pitman rod 164 connected at one end to a short crank 165 secured to the outer end of the shaft 22 and at the other end to a crank 166 secured to the rod 161, the length of the cranks being such as to cause an oscillation of the rock shaft of about one hundred and twenty degrees. The cams 160 are of such shape as to initially lift the frame from its lowered rearmost position and then force the frame to forward position during the latter portion of its rising movement, and then lower it in forward position, the contact block 162 acting at the end of the downward movement to kick the frame rearwardly with the effect and for the purpose already explained. The frictional contact of the cams 160 in the forked ends of the side bars, as the crank 166 rocks forwardly and the frame is lifted, tends to roll the side bars forwardly and thus yieldingly stresses the cakes toward and against the rear stop bar 132.

To enable the hopper shifting mechanism and knock-out pins to be disconnected and stand idle while other parts of the machine are being shifted in timed relation—usually by hand—in changing or adjusting the feed plates, stop bars and stencil plates so as to correct inaccuracies or adapt the machine to operate upon wafers of a different size, I mount the oval pinion 23$^a$, to which movement is imparted by the pinion 22$^a$ and connections heretofore described, upon a hub 23$^b$ provided with opposite lugs 170 arranged to cooperate with notches formed upon a sliding sleeve 171 engaged by the ends of a cotter pin 172, carried by and secured to a shifting rod 173 which is slidingly mounted in an axial bore in the shaft 23, the cotter pin extending through opposite slots in such shaft. A hand lever 174 is provided for shifting the rod longitudinally so as to bring about engagement or disengagement of the lugs 170 of the hub 23$^b$ with the notches of the sleeve 171, and thus either clutch the gear 23$^a$ to the shaft 23, or permit it to rotate idly thereon.

It will be understood that the alternate periods of rest and movement of the carrier belt are equal, and that during each period of rest the belt is first lifted to present the cakes to the stencil openings, the hoppers then shifted across to the opposite side of the stencil box to perform the coating of the cakes, and the belt then lowered and the knock-out pins depressed in their final sudden stripping movement, after which the next feeding movement of the belt takes place. The preliminary movements of the knock-out pins and the movements of the feed rollers and feed plates in the front confection hopper are coincident with the movements of the hopper.

If it is desired to produce wafers having but one layer of confection, one coating mechanism only (usually the front one) is employed; and if it is desired to produce a coated wafer, whether single coated or double-coated, without a cover wafer, the front cake magazine only is supplied with wafers. My machine is therefore adapted to produce a variety of products with no change other than a change in the materials supplied or operated upon, though if desired certain of the parts operating idly in making some of the products may be disconnected. By suitable changes in the shape of the stencil openings and corresponding changes of the notched feed plates and stop bars, and by adjustment of the height of the magazine, if required, the machine may be adapted to operate upon cakes of different sizes and shapes, as square, oblong, oval, round, etc., and of different thickness, and a great variety of products may readily be produced.

It will be understood that while the particular embodiment of my invention above described is a relatively short, compact machine, in which the two coating mechanisms are arranged near together over a single carrier belt, the described construction does not exclude from the scope of the claims (except as necessarily inherent in the recited structure) other constructions and arrangements having more widely separated or independent coating and cake-conveying mechanisms arranged to operate in synchronism for the purpose and in substantially the manner described.

I claim:

1. In a machine for coating cakes, an endless intermittently movable fabric carrier belt arranged to receive cross rows of cakes, coating mechanism including a stencil plate having a row of stencil openings in alignment with rows of cakes at their periods of rest, and a lifting member having spaced front and rear lifting edges at opposite sides of said stencil openings and arranged to reciprocate vertically to lift said belt and bring the cakes thereon into cushioned contact with said stencil plate around the margins of the stencil openings therein.

2. In a machine for coating cakes, a cake supporting table having a transverse gap, an endless intermittently movable fabric carrier belt arranged to travel over said table, means for imposing cross rows of cakes on said belt in position to stop in vertical alignment with said gap, coating mechanism including a stencil plate having a row of openings in vertical alignment with said gap, and a lifting member having separated front and rear lifting edges adjacent the opposite edges of said gap and arranged to reciprocate vertically to lift said belt and bring the cakes thereon into cushioned contact with said stencil plate around the margins of the stencil openings therein.

3. In a machine for coating cakes, a cake supporting table having a plurality of transverse gaps, an endless intermittently-movable carrier belt arranged to travel over said table, a plurality of coating mechanisms including stencil plates respectively having rows of openings in vertical alignment with the gaps in the table, lifting members respectively disposed within said gaps and arranged to lift said belt, and means for simultaneously lifting said members.

4. In a machine for coating cakes, a cake supporting table having a plurality of transverse gaps, an endless intermittently-movable carrier belt arranged to travel over said table, a plurality of coating mechanisms including stencil plates respectively having rows of openings in vertical alignment with the gaps in the table, lifting members respectively disposed within said gaps and arranged to lift said belt, and means for simultaneously lifting said members, said lifting members being independently vertically adjustable.

5. In a machine for coating cakes, an intermittently movable carrier belt arranged to support the cakes, a stationary stencil plate above said belt having a series of stencil openings, a reciprocating confection hopper having an opened bottom arranged to slide on said plate across said openings to coat the cakes during intervals of rest of the carrier belt, a vertically reciprocable stripper member connected to said hopper to reciprocate horizontally therewith and arranged to occupy a position of vertical alignment with said opening at the end of a coating movement of the hopper, lifting means arranged to raise and lower said belt and bring the cakes on the belt against said stencil plate and lower them therefrom, and means independent of said lifting means for imparting a vertical stripping movement to said stripper member while in such aligned position.

6. In a machine for coating cakes, an intermittently movable carrier arranged to support the cakes, a stationary stencil plate having a series of stencil openings, a reciprocating hopper frame and confection hopper having an open bottom arranged to slide on said plate across said openings to coat the cakes during the intervals of rest of the carrier, a vertically reciprocable stripper member slidingly mounted in said hopper frame and arranged to occupy a position of vertical alignment with said openings at the end of a coating movement of the hopper, and means for imparting a vertical stripping movement to said stripper member while in such aligned position.

7. In a machine for coating cakes, an intermittently-movable carrier arranged to support the cakes, a stationary stencil plate having a series of stencil openings, a reciprocating confection hopper having an open bottom arranged to slide on said plate across said openings to coat the cakes during intervals of rest of the carrier, a vertically reciprocable stripper member connected with said hopper to reciprocate horizontally therewith and arranged to occupy a position of vertical alignment with said openings at the end of a coating movement of the hopper, and means for imparting a sudden downward movement to the stripper member while in such aligned position.

8. In a machine for coating cakes, an intermittently-movable carrier arranged to support the cakes, a stationary stencil plate having a series of stencil openings, a reciprocating confection hopper having an open bottom arranged to slide on said plate across said openings in alternate directions during successive intervals of rest of the carrier to coat the cakes thereon, a pair of vertically reciprocable stripper members carried by the hopper and arranged to alternately occupy opposite positions of vertical alignment with the stencil openings at the end of the alternating movements of the hopper, and means for alternately imparting a vertical stripping movement to the stripper members when in aligned positions.

9. In a machine for coating cakes, an intermittently-movable carrier arranged to support the cakes, a stationary stencil plate having a series of stencil openings, a reciprocating confection hopper having an open bottom arranged to slide on said plate across said openings, to coat the cakes during intervals of rest of the carrier, a vertically reciprocable stripper member mounted on said hopper, and arranged to occupy a position of vertical alignment with said openings at the end of a coating movement of the hopper, a rocking member pivoted on a stationary member and having a cam surface operatively connected with said stripper member to raise and lower it, and means for rocking said rocking member while said stripper member is in lowered position to impart a stripping movement to such member.

10. In a machine for coating cakes, an intermittently-movable carrier arranged to support the cakes, a stationary stencil plate having a series of stencil openings, a reciprocating confection hopper having an open bottom arranged to slide on said plate across said openings to coat the cakes during intervals of rest of the carrier, a member mounted to slide vertically on said hopper and equipped with stripper pins, said pins being arranged to occupy a position of vertical alignment with said stencil openings at the end of a coating movement of the hopper, a rock shaft journaled in a stationary bearing, a rocking lever on said shaft having an inclined cam slot operatively connected with said vertically sliding member to raise and lower it, and means for rocking said shaft to cause a further downward movement of the sliding member and stripping pins when they are in lowered position.

11. In a machine for coating cakes, an intermittently-movable carrier arranged to support the cakes, a stationary stencil plate having a series of stencil openings, a reciprocating confection hopper having an open bottom arranged to slide on said plate across said openings in alternate directions during successive intervals of rest of the carrier to coat the cakes thereon, a pair of vertically reciprocable members slidingly mounted on opposite sides of the hopper and equipped with stripper pins, said pins being arranged to alternately occupy positions of vertical alignment with the stencil openings at the end of the alternating movements of the hopper, a pair of rock shafts journaled in stationary bearings, a rocking lever on each shaft having an inclined cam slot operatively connected respectively with said sliding members to raise and lower them, and means for rocking said shafts alternately to cause alternate further downward movements of the sliding members and stripping pins when they are in lowered position.

12. In a machine for coating cakes, an intermittently-movable carrier arranged to support the cakes, a stationary stencil plate having a series of stencil openings, a reciprocating confection hopper having an open bottom arranged to slide on said plate across said openings to coat the cakes during intervals of rest of the carrier, a vertically reciprocable stripper member mounted on said hopper and arranged to occupy a position of vertical alignment with said openings at the end of a coating movement of the hopper, means governed by relative movement of the hopper and machine frame for raising and lowering said stripper member, and independent means for imparting a further downward movement to such stripper member.

13. In a machine for coating cakes, an intermittently-movable carrier arranged to support the cakes, a stationary stencil plate having a series of stencil openings, a reciprocating confection hopper having an open bottom arranged to slide on said plate across said openings to coat the cakes during intervals of rest of the carrier, a vertically reciprocable stripper member mounted on said hopper and arranged to occupy a position of vertical alignment with said openings at the end of a coating movement of the hopper, means governed by relative movement of the hopper and machine frame for raising and lowering said stripper member, and independent cam means arranged to impart a sudden further downward movement and immediate return movement to such stripper member.

14. In a machine for coating cakes, an intermittently-movable carrier arranged to support the cakes, a stationary stencil plate having a series of stencil openings, a reciprocating confection hopper having an open bottom arranged to slide on said plate across said openings to coat the cakes during intervals of rest of the carrier, a vertically reciprocable stripper member mounted on said hopper and arranged to occupy a position of vertical alignment with said openings at the end of a coating movement of the hopper, means for gradually lowering said stripper member into proximity with the cakes, and means for imparting a sudden downward movement to such stripper.

15. In a machine for coating cakes, an intermittently-movable carrier arranged to support the cakes, a stationary stencil plate having a series of stencil openings, a reciprocating confection hopper having an open bottom arranged to slide on said plate across said openings to coat the cakes during intervals of rest of the carrier, a vertically reciprocable stripper member mounted on said hopper and arranged to occupy a position of vertical alignment with said openings at the end of a coating movement of the hopper, means governed by relative movement of the hopper and machine frame for raising and lowering said stripper member, and a cam operably connected to said stripper member and having cam surfaces arranged to impart a further gradual downward movement and a short sudden further downward movement and an immediate return movement to said stripper member.

16. In a machine for coating cakes, an intermittently-movable carrier arranged to support the cakes, a stationary stencil plate having a series of stencil openings, a reciprocating confection hopper having an open bottom arranged to slide on said plate across said openings in alternate directions during successive intervals of rest of the carrier, a pair of vertically reciprocable stripper members carried by the hopper and arranged to alternately occupy opposite positions of vertical alignment with the stencil openings at the end of the alternating movements of the hopper, means governed by relative movement of the hopper and machine frame for simultaneously raising one stripper member and lowering the other in alternation, and means for imparting a further sudden downward movement to the lowered stripping member at the end of each hopper movement.

17. In a machine for coating cakes, an intermittently-movable carrier arranged to support the cakes, a stationary stencil plate having a series of stencil openings, a reciprocating confection hopper having an open bottom arranged to slide on said plate across said openings in alternate directions during successive intervals of rest of the carrier, a pair of vertically reciprocable stripper members carried by the hopper and arranged to alternately occupy opposite positions of vertical alignment with the stencil openings at the end of the alternating movements of the hopper, means governed by relative movement of the hopper and machine frame for simultaneously raising one stripper member and lowering the other in alternation, and independent cams operably connected with said stripper member and having cam surfaces arranged to alternately impart a further gradual downward movement and a short sudden downward movement and an immediate return movement to such stripper members.

18. In a machine for coating cakes, an intermittently-movable carrier arranged to support the cakes in cross-rows, a stencil plate having a corresponding row of stencil openings, means for bringing said cakes into juxtaposition with said openings during intervals of rest of the carrier, a reciprocating hopper having an open bottom arranged to slide on said plate across said openings alternately forwardly during one period of rest and rearwardly during the next such period, and a pair of stripper mechanisms on said hopper arranged to operate alternately at the end of successive hopper movements.

19. In a machine for coating cakes, an intermittently-movable carrier arranged to support the cakes in cross-rows, a stencil plate having a corresponding row of stencil openings, a hopper having an open bottom arranged to slide on said plate across said openings, and means for reciprocating said hopper comprising a shaft constantly rotating at a variable speed, a crank operatively connected with the hopper, and means for connecting said shaft and crank during the half-revolution of greatest speed of said shaft and disconnecting said members during the other half revolution.

20. In a machine for coating cakes, an endless intermittently-movable carrier belt, a magazine formed with a cross-row of vertical cake receptacles, a slide for feeding cakes from said receptacles onto said belt, a coating mechanism arranged rearwardly of said cake magazine, a vertically movable stop bar arranged rearward of said coating mechanism, a second cake magazine, a feed slide for feeding cakes from said magazine onto coated cakes on said carrier belt, and a vertically-movable rear stop bar arranged to align the cover cakes on said coated cakes.

21. In a machine of the character described, an intermittently-movable carrier belt, means for feeding cakes in rows on said belt, means for coating said cakes, a magazine formed with a cross-row of vertical cake receptacles, a notched slide for feeding cakes from said receptacles onto coated cakes on said belt, and a correspondingly notched vertically movable stop bar arranged to coact with both the coated and cover cakes to align them with each other.

22. In a machine of the character described, an intermittently-movable carrier belt, means for feeding cakes in rows on said belt, means for coating said cakes, a magazine formed with a cross-row of vertical cake receptacles, a notched slide for feeding cakes from said receptacles onto coated cakes on said belt, and a correspondingly notched vertically movable stop bar in rear of said slide, said slide and bar being arranged to center the cover cakes between them.

23. A machine for coating cakes according to claim 22 in which said slide and bar are relatively adjustable transversely of the direction of travel of the cakes.

24. A machine for coating cakes according to claim 22 in which said slide and bar are relatively adjustable lengthwise of the carrier belt.

25. A machine for coating cakes according to claim 22 in which said stop bar is hinged.

26. In a machine of the character described and having a cake carrier and means for feeding cakes in rows on said carrier and means for coating said cakes and means for imposing cover cakes on said coated cakes, a vertically reciprocable transverse bar, and a series of depending pins secured to said bar and arranged to contact said cakes to form sandwiched cakes of uniform thickness.

27. In a machine of the character described and having a cake carrier and means for feeding cakes in rows on said carrier and means for coating said cakes and means for imposing cover cakes on said coated cakes, a vertically reciprocable transverse bar, and a series of depending pins secured to said bar and equipped with cushioned contact members arranged to press the cover cakes down to form sandwiched cakes of uniform thickness.

28. In a machine of the character described and having a cake carrier and means for feeding cakes in rows on said carrier and means for coating said cakes and means for imposing cover cakes on said coated cakes, a stop bar arranged to stop the sandwiched cakes, and vertically movable pressure means for pressing the cakes together, said pressure means having a slight rearward movement at the end of its downward movement.

29. In a machine of the character described and having a cake carrier and means for feeding cakes in rows on said carrier and means for coating said cakes and means for imposing cover cakes on said coated cakes, a stop bar arranged to stop the sandwiched cakes, and pressure means for pressing the cakes together comprising a rising and falling frame equipped with pressure members, and having a pair of forked side members, a rock shaft extending through said forked side members, a pair of cams on said shaft arranged to raise and lower said side frame members, and an eccentric contact block on said shaft arranged to knock the lower end of said side frame members rearwardly at the limit of downward movement of such frame.

30. In a machine of the character described and having a plate with a series of stencil openings and a confection hopper having a sliding base formed with a narrow extended feed opening arranged to reciprocate across said stencil openings means for feeding said confection comprising a pair of rollers arranged above and on opposite sides of said feed opening and arranged to rotate downwardly towards each other, said rollers being arranged to rotate at different peripheral speeds.

31. In a machine of the character described and having a plate with a series of stencil openings and a confection hopper having a sliding base formed with a narrow extended feed opening arranged to reciprocate across said stencil openings, means for feeding said confection comprising a pair of oscillating plates pivoted above and on opposite sides of the feed opening and arranged to force the confection downwardly while moving from one extreme position to the other.

32. In a machine of the character described, a plate having a stencil opening, a spreading member arranged to spread confection into said opening, a second plate having a stencil opening of larger area than the opening in said first mentioned plate, a second spreading member arranged to spread confection into the opening in said second plate, and means for automatically presenting cakes in succession first to the openings of said first mentioned plate and then to the openings of said second mentioned plate.

33. In a machine of the character described, a plate having a stencil opening, a spreading member arranged to spread confection into said opening, a second plate thicker than said first mentioned plate and having a stencil opening of larger area than the opening in said first mentioned plate, a second spreading member arranged to spread confection into the opening in said second plate, and means for automatically presenting cakes in succession first to the openings of the said first mentioned plate and then to the openings of said second mentioned plate.

34. In a machine of the character described, a plate having a stencil opening, a spreading member arranged to spread confection into said opening, a second plate of greater thickness than said first mentioned plate and also provided with a stencil opening, a second spreading member arranged to spread confection into the opening in said second plate, and means for automatically presenting cakes in succession first to the openings of said first mentioned plate and then to the openings of said second mentioned plate.

35. In a machine of the character described, a plate having a stencil opening, a spreading member arranged to spread confection into said opening, a second plate having a stencil opening of larger area than the opening in said first mentioned plate, a second spreading member arranged to spread confection into the opening in said second plate, and means for automatically presenting cakes in succession first to the openings of said first mentioned plate and then to the openings of said second mentioned plate, both said plates being arranged to contact the cakes marginally adjacent the edge of the stencil openings.

36. In a machine of the character described and having a carrier adapted to support cakes in transverse rows and a reciprocable open-bottom hopper having an extended narrow feed opening, stencil supporting means comprising a frame member, a pair of side bottom plate members secured to said frame member, at least one of said side bottom plate members being laterally adjustable, means for tightening up said laterally adjustable member, and a stencil plate proper interlocking at its edges with said side bottom plate members.

37. In a machine of the character described and having a plate with a series of stencil openings and a confection hopper having a sliding base formed with a narrow extended feed opening arranged to reciprocate across said stencil openings, means for feeding said confection including a pair of rollers arranged above and on opposite sides of said feed opening and arranged to rotate downwardly towards each other, and operating means flexibly connected to said rollers and arranged to intermittently rotate them.

38. In a machine for coating cakes, a flexible carrier belt arranged to receive and convey cakes to be coated, coating mechanism including a stencil plate having a plurality of openings therein positioned above said belt, means for intermittently moving the belt to bring the cakes thereon in alignment with said openings and to maintain said cakes in alignment therewith during the coating operation, a rigid lifting member for the belt, and means to raise and lower said lifting member to lift the belt and bring the cakes thereon into contact with the stencil plate around the margins of said openings and to lower the cakes therefrom, the flection of said belt serving to move said cakes into yielding contact with the stencil plate.

39. In a machine for coating cakes, a flexible carrier belt adapted to receive and convey cakes to be coated, a stencil plate positioned above said belt and having a series of openings therein, means for intermittently moving the belt to bring said cakes into alignment with said openings and maintain the same in alignment during the coating operation, hopper means including an open bottomed hopper arranged to slide on said plate across said openings and adapted to introduce coating material through the openings onto the cakes, a member having spaced front and rear lifting edges positioned below the belt in the plane of said openings, and means to raise said member and force said belt upwardly whereby the cakes are moved into yielding engagement with the stencil plate around the margins of the openings therein.

40. In a machine for coating cakes, an intermittently movable carrier belt adapted to receive and convey the cakes to be coated, a stencil plate having a plurality of openings therein positioned above said belt, a confection hopper having an open bottom arranged to slide on said plate across said openings to coat the cakes during the intervals of rest of said belt, a stripper member operatively associated with said hopper for movement therewith and adapted to occupy a position of vertical alignment with said openings at the end of a coating movement of the hopper, means for raising and lowering said belt to bring cakes thereon into engagement with the stencil means and to lower said cakes therefrom, and means for imparting a stripping movement to the stripper member simultaneously with the downward movement of the belt whereby coated cakes are positively disengaged from contact with the stencil means.

FERDINANDO G. SALERNO.